United States Patent
Colgrove et al.

(10) Patent No.: US 11,249,999 B2
(45) Date of Patent: Feb. 15, 2022

(54) MEMORY EFFICIENT SEARCHING

(71) Applicant: Pure Storage, Inc., Mountain View, CA (US)

(72) Inventors: John Colgrove, Los Altos, CA (US); Ethan L. Miller, Santa Cruz, CA (US); Neil Amar Vachharajani, Menlo Park, CA (US); Feng Wang, Sunnyvale, CA (US)

(73) Assignee: Pure Storage, Inc., Mountain View, CA (US)

(*) Notice: Subject to any disclaimer, the term of this patent is extended or adjusted under 35 U.S.C. 154(b) by 147 days.

(21) Appl. No.: 16/206,595

(22) Filed: Nov. 30, 2018

(65) Prior Publication Data
US 2019/0095490 A1    Mar. 28, 2019

Related U.S. Application Data

(63) Continuation of application No. 14/846,566, filed on Sep. 4, 2015, now abandoned.

(51) Int. Cl.
G06F 16/2455    (2019.01)
G06F 16/22      (2019.01)

(52) U.S. Cl.
CPC ...... *G06F 16/2455* (2019.01); *G06F 16/2255* (2019.01)

(58) Field of Classification Search
None
See application file for complete search history.

(56) References Cited

U.S. PATENT DOCUMENTS

| 5,208,813 | A | 5/1993 | Stallmo |
|---|---|---|---|
| 5,403,639 | A | 4/1995 | Belsan |
| 5,940,838 | A | 8/1999 | Schmuck et al. |
| 6,263,350 | B1 | 7/2001 | Wollrath et al. |
| 6,286,056 | B1 | 9/2001 | Edgar et al. |

(Continued)

FOREIGN PATENT DOCUMENTS

| CN | 103370685 A | 10/2013 |
|---|---|---|
| CN | 103370686 A | 10/2013 |

(Continued)

OTHER PUBLICATIONS

Microsoft Corporation, "GCSettings.IsServerGC Property", Retrieved Oct. 27, 2013 via the WayBack Machine, 3 pages.

(Continued)

*Primary Examiner* — Christopher J Raab
(74) *Attorney, Agent, or Firm* — Womble Bond Dickinson (US) LLP

(57) ABSTRACT

Methods and apparatus for determining if a value is stored in a hash table is provided. The method includes breaking the value into address bits, prefix bits, and signature bits. The method includes determining a container in a compressed index at an address specified by the address bits, the container comprised of a prefix table with bits set corresponding to the prefix bits determined by aggregate values associated with the container and a signature table containing the signature bits determined by the aggregate values associated with the container. The method includes determining a result based on a function of the prefix and signature tables and the determined prefix and signature bits.

20 Claims, 4 Drawing Sheets

(56) References Cited

U.S. PATENT DOCUMENTS

| | | |
|---|---|---|
| 6,412,045 B1 | 6/2002 | DeKoning et al. |
| 6,718,448 B1 | 4/2004 | Ofer |
| 6,757,769 B1 | 6/2004 | Ofer |
| 6,799,283 B1 | 9/2004 | Tamai et al. |
| 6,804,703 B1 | 10/2004 | Allen et al. |
| 6,834,298 B1 | 12/2004 | Singer et al. |
| 6,850,938 B1 | 2/2005 | Sadjadi |
| 6,915,434 B1 | 7/2005 | Kuroda |
| 6,954,881 B1 | 10/2005 | Flynn, Jr. et al. |
| 6,973,549 B1 | 12/2005 | Testardi |
| 7,028,216 B2 | 4/2006 | Aizawa et al. |
| 7,028,218 B2 | 4/2006 | Schwarm et al. |
| 7,039,827 B2 | 5/2006 | Meyer et al. |
| 7,139,907 B2 | 11/2006 | Bakke et al. |
| 7,216,164 B1 | 5/2007 | Whitmore et al. |
| 7,272,674 B1 | 9/2007 | Nandi et al. |
| 7,313,636 B2 | 12/2007 | Qi |
| 7,577,802 B1 | 8/2009 | Parsons |
| 7,783,682 B1 | 8/2010 | Patterson |
| 7,814,149 B1* | 10/2010 | Stringham .......... G06F 16/1748 709/203 |
| 7,827,218 B1* | 11/2010 | Mittal ................ G06F 16/2228 707/899 |
| 7,873,619 B1 | 1/2011 | Faibish et al. |
| 7,913,300 B1 | 3/2011 | Flank et al. |
| 7,933,936 B2 | 4/2011 | Aggarwal et al. |
| 7,979,613 B2 | 7/2011 | Zohar et al. |
| 8,086,652 B1 | 12/2011 | Bisson et al. |
| 8,103,754 B1 | 1/2012 | Luong et al. |
| 8,117,464 B1 | 2/2012 | Kogelnik |
| 8,200,887 B2 | 6/2012 | Bennett |
| 8,205,065 B2 | 6/2012 | Matze |
| 8,301,811 B1 | 10/2012 | Wigmore et al. |
| 8,352,540 B2 | 1/2013 | Anglin et al. |
| 8,468,320 B1* | 6/2013 | Stringham ............ G06F 3/0608 707/610 |
| 8,495,111 B1* | 7/2013 | Wang ................ G06F 11/0727 707/829 |
| 8,527,544 B1 | 9/2013 | Colgrove et al. |
| 8,560,747 B1 | 10/2013 | Tan et al. |
| 8,621,241 B1 | 12/2013 | Stephenson |
| 8,645,649 B2 | 2/2014 | Kaiya et al. |
| 8,700,875 B1 | 4/2014 | Barron et al. |
| 8,751,463 B1 | 6/2014 | Chamness |
| 8,751,763 B1* | 6/2014 | Ramarao ............. G06F 16/1752 711/162 |
| 8,806,160 B2 | 8/2014 | Colgrove et al. |
| 8,874,850 B1 | 10/2014 | Goodson et al. |
| 8,959,305 B1 | 2/2015 | Lecrone et al. |
| 9,063,937 B2 | 6/2015 | McDowell et al. |
| 9,081,713 B1 | 7/2015 | Bennett |
| 9,189,334 B2 | 11/2015 | Bennett |
| 9,294,567 B2 | 3/2016 | Hussain et al. |
| 9,311,182 B2 | 4/2016 | Bennett |
| 9,423,967 B2 | 8/2016 | Colgrove et al. |
| 9,430,412 B2 | 8/2016 | Huang |
| 9,436,396 B2 | 9/2016 | Colgrove et al. |
| 9,436,720 B2 | 9/2016 | Colgrove et al. |
| 9,454,476 B2 | 9/2016 | Colgrove et al. |
| 9,454,477 B2 | 9/2016 | Colgrove et al. |
| 9,501,245 B2 | 11/2016 | Hussain et al. |
| 9,513,820 B1 | 12/2016 | Shalev |
| 9,516,016 B2 | 12/2016 | Colgrove et al. |
| 9,552,248 B2 | 1/2017 | Miller et al. |
| 9,565,269 B2 | 2/2017 | Malwankar et al. |
| 9,632,870 B2 | 4/2017 | Bennett |
| 9,639,543 B2 | 5/2017 | Li et al. |
| 9,917,776 B2* | 3/2018 | Hasani ................ H04L 45/748 |
| 2002/0038436 A1 | 3/2002 | Suzuki |
| 2002/0087544 A1 | 7/2002 | Selkirk et al. |
| 2002/0178335 A1 | 11/2002 | Selkirk et al. |
| 2003/0140209 A1 | 7/2003 | Testardi |
| 2004/0049572 A1 | 3/2004 | Yamamoto et al. |
| 2005/0066095 A1 | 3/2005 | Mullick et al. |
| 2005/0216535 A1 | 9/2005 | Saika et al. |
| 2005/0223154 A1 | 10/2005 | Uemura |
| 2006/0074940 A1 | 4/2006 | Craft et al. |
| 2006/0095588 A1* | 5/2006 | Van Lunteren ..... H04L 45/7457 709/246 |
| 2006/0136365 A1 | 6/2006 | Kedem et al. |
| 2006/0152755 A1* | 7/2006 | Curtis .................. G06F 16/338 358/1.15 |
| 2006/0155946 A1 | 7/2006 | Ji |
| 2007/0067585 A1 | 3/2007 | Ueda et al. |
| 2007/0109856 A1 | 5/2007 | Pellicone et al. |
| 2007/0113007 A1 | 5/2007 | Murayama et al. |
| 2007/0162954 A1 | 7/2007 | Pela |
| 2007/0171562 A1 | 7/2007 | Maejima et al. |
| 2007/0174673 A1 | 7/2007 | Kawaguchi et al. |
| 2007/0220313 A1 | 9/2007 | Katsuragi et al. |
| 2007/0245090 A1 | 10/2007 | King et al. |
| 2007/0266179 A1 | 11/2007 | Chavan et al. |
| 2008/0034167 A1 | 2/2008 | Sharma et al. |
| 2008/0059699 A1 | 3/2008 | Kubo et al. |
| 2008/0065852 A1 | 3/2008 | Moore et al. |
| 2008/0126734 A1 | 5/2008 | Murase |
| 2008/0134174 A1 | 6/2008 | Sheu et al. |
| 2008/0155191 A1 | 6/2008 | Anderson et al. |
| 2008/0178040 A1 | 7/2008 | Kobayashi |
| 2008/0209096 A1 | 8/2008 | Lin et al. |
| 2008/0244205 A1 | 10/2008 | Amano et al. |
| 2008/0275928 A1 | 11/2008 | Shuster |
| 2008/0282045 A1 | 11/2008 | Biswas et al. |
| 2008/0285083 A1 | 11/2008 | Aonuma |
| 2008/0307270 A1 | 12/2008 | Li |
| 2009/0006587 A1 | 1/2009 | Richter |
| 2009/0037662 A1 | 2/2009 | La Frese et al. |
| 2009/0043958 A1 | 2/2009 | Kaneda et al. |
| 2009/0204858 A1 | 8/2009 | Kawaba |
| 2009/0228648 A1 | 9/2009 | Wack |
| 2009/0300084 A1 | 12/2009 | Whitehouse |
| 2010/0057673 A1 | 3/2010 | Savov |
| 2010/0058026 A1 | 3/2010 | Heil et al. |
| 2010/0067706 A1 | 3/2010 | Anan et al. |
| 2010/0077205 A1 | 3/2010 | Ekstrom et al. |
| 2010/0082879 A1 | 4/2010 | McKean et al. |
| 2010/0106905 A1 | 4/2010 | Kurashige et al. |
| 2010/0114843 A1* | 5/2010 | Farrar ................ G06F 16/2246 707/693 |
| 2010/0153620 A1 | 6/2010 | McKean et al. |
| 2010/0153641 A1 | 6/2010 | Jagadish et al. |
| 2010/0191897 A1 | 7/2010 | Zhang et al. |
| 2010/0250802 A1 | 9/2010 | Waugh et al. |
| 2010/0250882 A1 | 9/2010 | Hutchison et al. |
| 2010/0281225 A1 | 11/2010 | Chen et al. |
| 2010/0287327 A1 | 11/2010 | Li et al. |
| 2011/0072300 A1 | 3/2011 | Rousseau |
| 2011/0121231 A1 | 6/2011 | Haas et al. |
| 2011/0145598 A1 | 6/2011 | Smith et al. |
| 2011/0161559 A1 | 6/2011 | Yurzola et al. |
| 2011/0167221 A1 | 7/2011 | Pangal et al. |
| 2011/0238634 A1 | 9/2011 | Kobara |
| 2012/0023375 A1 | 1/2012 | Dutta et al. |
| 2012/0036309 A1 | 2/2012 | Dillow et al. |
| 2012/0090035 A1* | 4/2012 | Mehta .................... G06Q 10/08 726/26 |
| 2012/0117029 A1 | 5/2012 | Gold |
| 2012/0198175 A1 | 8/2012 | Atkisson |
| 2012/0330954 A1 | 12/2012 | Sivasubramanian et al. |
| 2013/0042052 A1 | 2/2013 | Colgrove et al. |
| 2013/0046995 A1 | 2/2013 | Movshovitz |
| 2013/0047029 A1 | 2/2013 | Ikeuchi et al. |
| 2013/0091102 A1 | 4/2013 | Nayak |
| 2013/0205110 A1 | 8/2013 | Kettner |
| 2013/0227236 A1 | 8/2013 | Flynn et al. |
| 2013/0275391 A1 | 10/2013 | Batwara et al. |
| 2013/0275656 A1 | 10/2013 | Talagala et al. |
| 2013/0283058 A1 | 10/2013 | Fiske et al. |
| 2013/0290648 A1 | 10/2013 | Shao et al. |
| 2013/0318314 A1 | 11/2013 | Markus et al. |
| 2013/0339303 A1 | 12/2013 | Potter et al. |
| 2014/0006498 A1* | 1/2014 | Liu ........................ H04L 67/02 709/204 |

(56) References Cited

U.S. PATENT DOCUMENTS

| | | |
|---|---|---|
| 2014/0052946 A1 | 2/2014 | Kimmel |
| 2014/0068791 A1 | 3/2014 | Resch |
| 2014/0089730 A1 | 3/2014 | Watanabe et al. |
| 2014/0101361 A1 | 4/2014 | Gschwind |
| 2014/0143517 A1 | 5/2014 | Jin et al. |
| 2014/0172929 A1 | 6/2014 | Sedayao et al. |
| 2014/0201150 A1 | 7/2014 | Kumarasamy et al. |
| 2014/0215129 A1 | 7/2014 | Kuzmin et al. |
| 2014/0229131 A1 | 8/2014 | Cohen et al. |
| 2014/0229452 A1 | 8/2014 | Serita et al. |
| 2014/0281308 A1 | 9/2014 | Lango et al. |
| 2014/0310476 A1* | 10/2014 | Kruus .............. G06F 12/0871 711/133 |
| 2014/0325115 A1 | 10/2014 | Ramsundar et al. |
| 2015/0019798 A1 | 1/2015 | Huang |
| 2015/0234709 A1 | 8/2015 | Koarashi |
| 2015/0244775 A1 | 8/2015 | Vibhor et al. |
| 2015/0278534 A1 | 10/2015 | Thiyagarajan et al. |
| 2016/0019114 A1 | 1/2016 | Han et al. |
| 2016/0098191 A1 | 4/2016 | Golden et al. |
| 2016/0098199 A1 | 4/2016 | Golden et al. |
| 2016/0269290 A1* | 9/2016 | Chu .................... H04L 45/748 |
| 2017/0024166 A1 | 1/2017 | Singh et al. |
| 2017/0123676 A1 | 5/2017 | Singhai et al. |

FOREIGN PATENT DOCUMENTS

| | | |
|---|---|---|
| CN | 104025010 B | 11/2016 |
| EP | 3066610 A1 | 9/2016 |
| EP | 3082047 A1 | 10/2016 |
| EP | 3120235 A | 1/2017 |
| JP | 2007-087036 A | 4/2007 |
| JP | 2007-094472 A | 4/2007 |
| JP | 2008-250667 A | 10/2008 |
| JP | 2010-211681 A | 9/2010 |
| WO | WO-1995/002349 A1 | 1/1995 |
| WO | WO-1999/013403 A1 | 3/1999 |
| WO | WO-2008/102347 A1 | 8/2008 |
| WO | WO-2010/071655 A1 | 6/2010 |

OTHER PUBLICATIONS

Microsoft Corporation, "Fundamentals of Garbage Collection", Retrieved Aug. 30, 2013 via the WayBack Machine, 11 pages.

Ouyang, J. et al., (Mar. 1-5, 2014) "SDF: Software-Defined Flash for Web-Scale Internet Storage Systems", ASPLOS 2014, 14 pages.

Zhang, J. et al., (2016) "Application-Aware and Software-Defined SSD Scheme for Tencent Large-Scale Storage System" 2016 IEEE 22$^{nd}$ International Conference on Parallel and Distributed Systems, 482-490.

"Open-Channel Solid State Drives NVMe Specification" (Apr. 2016), 24 pages.

* cited by examiner

MEMORY EFFICIENT SEARCHING

REFERENCE TO RELATED APPLICATIONS

This application is a continuation of U.S. application Ser. No. 14/846,566 filed Sep. 4, 2015, which is hereby incorporated by reference.

BACKGROUND

Hash tables map keys to values, and are often more efficient for doing so than other types of lookup tables and data structures. Hash tables find wide use for associative arrays, database indexing, data deduplication, and other data structures and tasks involving large amounts of data and key-value pairs. However, searching through large hash tables can be time-consuming and processor cycle intensive. Large hash tables may be too large to keep in local memory or DRAM (dynamic random access memory), necessitating keeping the larger hash tables in larger or denser but slower access memory, which then increases the amount of time needed for searching through the hash table.

SUMMARY

In some embodiments, a processor-based method for determining if a value is stored in a hash table is provided. The method includes breaking the value into address bits, prefix bits, and signature bits. The method includes determining a container in a compressed index at an address specified by the address bits, the container comprised of a prefix table with bits set corresponding to the prefix bits determined by aggregate values associated with the container and a signature table containing the signature bits determined by the aggregate values associated with the container. The method includes determining a result based on a function of the prefix and signature tables and the determined prefix and signature bits.

In some embodiments, a tangible, non-transitory, computer-readable media having instructions thereupon which, when executed by a processor, cause the processor to perform a method. The method includes separating bits of a value into address bits, prefix bits and signature bits. The method includes determining a container using the compressed index at an address specified by the address bits, wherein the container comprises a prefix table with bits set according to the prefix bits determined by aggregate values associated with the container and a signature table containing the signature bits determined by the aggregate values associated with the container. The method includes determining a result based on a function of the prefix and signature tables and the determined prefix and signature bits.

In some embodiments, a computing, communication or storage system is provided. The system includes one or more processors configured to break a value into address bits, prefix bits and signature bits, determine a container using a compressed index at an address specified by the address bits. The container is comprised of a prefix table with bits according to the prefix bits determined by aggregate values associated with the container and a signature table containing the signature bits determined by the aggregate values associated with the container. The processor is configured to determine a result based on a function of the prefix and signature tables and the determined prefix and signature bits, wherein the one or more processors determine if the value is stored in a hash table.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

Various system embodiments described herein use a summary table that corresponds to a hash table, for efficient and deterministic searching using compressed indexes. Various embodiments use multiple levels of hash tables that can be cached in memory, and multiple summary tables with similar flexibility. Multiple hash values, from a hash table, are encoded into each bucket of the corresponding summary table. The summary table is constructed, based on the hash values of the hash table, and then later used for searching for a hash value of interest. The mechanisms and techniques described herein improve computing efficiency and decrease search time latency in various systems that use hash tables. Examples are provided for using the summary table(s) and hash table(s) to locate data in a data storage environment, and further uses for these are readily devised, including outside of data storage environments, in keeping with the teachings herein.

Figure 1:
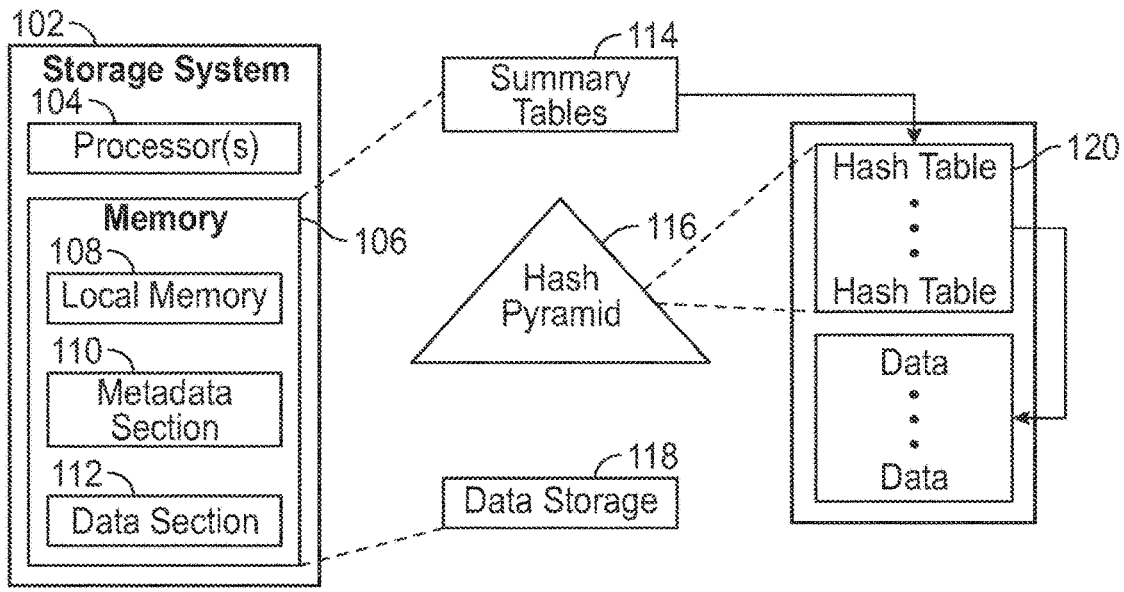
FIG. 1 is a system action and block diagram, showing a storage system using summary tables to summarize hash tables in a hash pyramid, which in turn point to data in a data storage in accordance with some embodiments.

FIG. 1 is a system action and block diagram, showing a storage system 102 using summary tables 114 to summarize hash tables 120 in a hash pyramid 116, which in turn point to data in a data storage 118. The example storage system 102 has one or more processors 104 and memory 106, divided into local memory 108, a metadata section 110, and a data section 112. Variations on this storage system 102 and/or memory organization are readily devised. It should be appreciated that the embodiments are not limited to storage systems as other computing devices may integrate the embodiments described herein. Local memory 108 could be implemented using DRAM (dynamic random access memory) in some embodiments. The data section 112 of the memory 106 may be implemented as storage memory. The memory 106 can be organized in various ways to include summary tables 114, a hash pyramid 116 and a data storage 118. The summary tables 114 correspond to the hash tables 120, for example on a one-to-one basis although variations can be devised that correspond in other ways as this example is not meant to be limiting. Some embodiments have a single summary table and a single hash table 120, some embodiments have multiple summary tables 114 and multiple hash tables 120, and some embodiments have multiple levels of summary tables 114 and multiple levels of hash tables 120 and the hash pyramid 116, etc.

Figure 2:
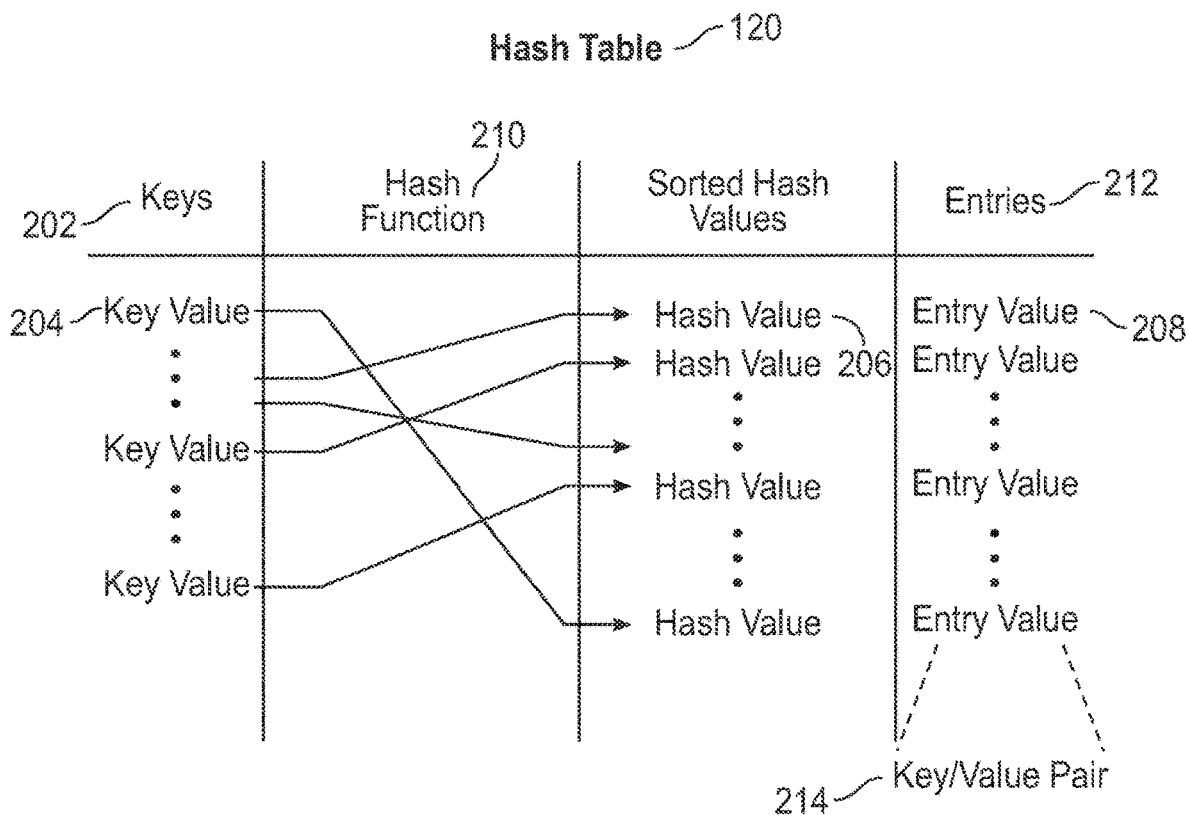
FIG. 2 depicts an example hash table, with keys, a hash function, sorted hash values, and entries that include key/value pairs in accordance with some embodiments.

FIG. 2 depicts an example hash table 120, with keys 202, a hash function 210, sorted hash values 206, and entries 212 that include key/value pairs 214. Hash tables 120 are used for many purposes in computing, communication and data management, and the following examples illustrate a few embodiments, with many more embodiments readily devised. A key 202 could be a name of a person, a business or a device, an address of a person, a business or a building, a logical address of data or a device, a physical address of data or a device, a pointer, etc., with each key 202 having a key value 204 as appropriate to the nature of the key 202. A key/value pair 214 could be a name of a person associated with an address of where the person lives, a telephone number of the person or a Social Security number of the person, a logical address of data associated with a physical address of data which then holds the binary, ASCII (American Standard Code for Information Interchange) or other code value of the data itself, an address of one level associated with an address of another level, a device name and a device identifier (e.g., a number or alphanumeric string), etc., with each key/value pair 214 having an entry 212 in the hash table as appropriate to the nature of the key/value pair 214. To populate, generate or otherwise produce a hash table, the key value 204 of each key 202 is run through a hash function 210, which produces a hash value 206. In some embodiments, the hash values 206 are then sorted, and placed in the hash table 120 with corresponding entry values 208. In alternate embodiments, the hash table 120 is constructed by adding keys one at a time to locations corresponding to the hash value 206 of the key. To use a hash table, a key 202 of interest submits a key value 204, which is evaluated with the hash function 210 to produce a hash value 206. The hash value 206 is looked up in the hash table, in the sorted hash values 206, and this is associated with a corresponding entry value 208. The entry value 208 includes the desired key/value pair 214.

Figure 3:
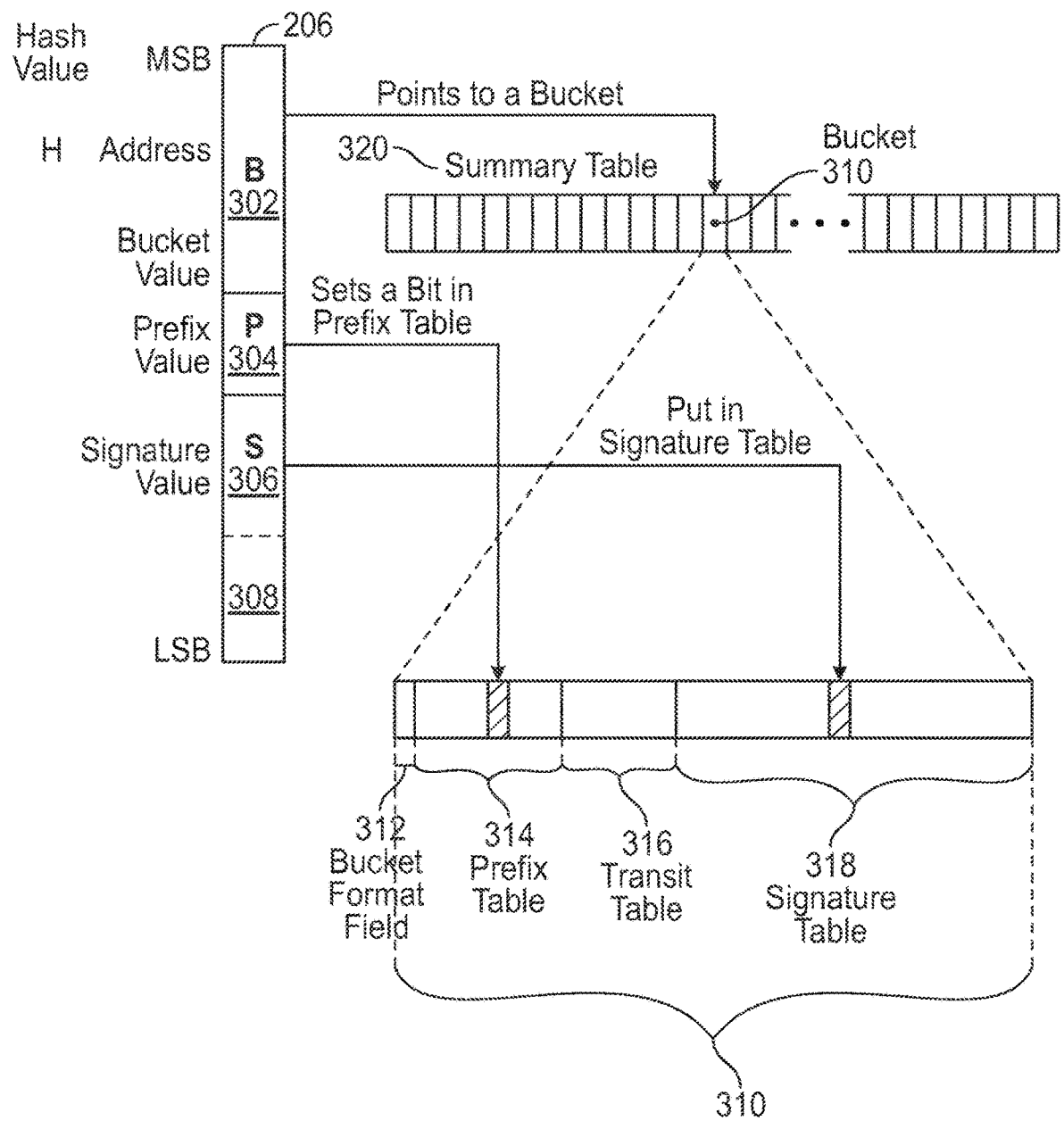
FIG. 3 depicts a summary table with buckets, each of which encodes multiple hash values from the hash table of FIG. 2 in accordance with some embodiments.

FIG. 3 depicts a summary table 320 with buckets 310, each of which encodes multiple hash values 206 from the hash table 120 of FIG. 2. To construct the summary table 320, each hash value 206 of a corresponding hash table 120 is decomposed into multiple bit fields 302, 304, 306. These bit fields 302, 304, 306 could be rearranged and have various sizes (i.e., numbers of bits) in various embodiments. The bucket address field 302 of the hash value 206 has multiple bits which are interpreted as a bucket address value, which points to a bucket 310. In other words, the bucket address field 302 acts as an address of a bucket 310 in the summary table 320. It should be appreciated that the bucket address field and associated value is taken from the most significant bits (MSB) of the hash value 206 in some embodiments. Each bucket 310 can hold, represent or index many hash values 206 that have the same bit values (i.e., bucket address value) in their respective bucket address fields 302.

The prefix field 304 of the hash value 206 has multiple bits which are interpreted as a prefix value, which sets a bit in the prefix table 314 of the bucket 310 pointed to by the bucket address value. For example, if the prefix value is a number N, the Nth bit in the prefix table 314 would be set. In a further embodiment, this bit is instead cleared. It follows that there must be a number of bits in the prefix table 314 equal to two raised to the power of the number of bits in the prefix field 304. For example, if there are eight bits in the prefix field 304, there must be two hundred and fifty-six (two raised to the eighth power) bits in the prefix table 314.

The signature field 306 of the hash value 206 has multiple bits which are interpreted as a signature, and put in the signature table 318. Depending upon the size (i.e., total number of bits) of the bucket 310, the signature field 306 could include all of the bits of the hash value 206 left over after the bits of the bucket address field 302 and the prefix field 304 are stripped off of the hash value 206. In some embodiments, the bits in a truncation field 308 could be removed, and the remaining bits used as the signature value. Signature values are placed into the signature table 318 in the same order or sequence as the sorted hash values 206 of the hash table 120. For example, the signature value of the lowest addressed hash value 206 to be represented in the bucket 310 is placed leftmost in the signature table 318. Subsequent signature values of subsequent addressed hash values 206 are placed in subsequent locations from left to right in the signature table 318. This could be reversed, i.e., starting from right and proceeding to left, in some embodiments.

The transit table 316 of the bucket 310 represents the sequence of the hash values 206 of the bucket 310. There could be as many bits in the transit table 316 as the maximum number of hash values that can be represented in the signature table 318 in some embodiments. This could be the same number of bits as the maximum number of signature values accommodated by the signature table 318 in one example. It should be appreciated that the transit table 316 does not have to be this large and in some embodiments the transit table 316 can dynamically shrink or grow for fewer or greater numbers of values. Starting with the most significant bit of the transit table 316, which corresponds to the lowest addressed hash value 206 represented in the bucket 310, this bit is automatically set to a value of one. Each less significant bit is set to a value of zero if the next higher addressed hash value 206 has the same prefix value as the preceding hash value 206, and is set to a value of one if the next higher addressed hash value 206 has a differing prefix value from the preceding hash value 206. The bit corresponding to the highest entry in the bucket is always set to one, in some embodiments. These values may be reversed (exchanging zero for one and one for zero), and may be filled MSB to LSB or LSB to MSB, and further variations may be devised.

An example set of hash values 206 and sample encoding into a bucket 310 illustrates an embodiment of the above-described mechanisms and processes. Suppose it is desired to encode the following six entries (e.g., six hash values 206 from a particular hash table 120), which are represented in hexadecimal, where B=16, P=4, and S=8. While these may or may not be optimal parameters for an actual implementation, they serve as an example and are not meant to be limiting.

54FE3618
54FD0831
54FE4884
54FEC01D
54FE3257
54FE4882

These hash values 206 are all in the same bucket, since the top 16 bits (B=16) or four hexadecimal digits (e.g., 54FE) are used to select the bucket. Next, the least significant four bits are truncated, and only the B+P+S=28 bits are kept. The list is sorted numerically, as shown below.

54FE083
54FE325
54FE361
54FE488
54FEC01

The system then builds a summary of the prefix values for the bucket 310. In this case, the prefix field 304 (P=4 bits, to the right of the B bits) of the hash values 206 have prefix values of (e.g., from the top, downward in the list) 0, 3 (twice), 4, and C, so the system sets the corresponding bits, out of 16, in the prefix table (with the least significant bit rightmost or last). This yields the following, for the prefix table 314.

Prefix_table=0001 0000 0001 1001 which shows the Cth bit, the fourth bit, the third bit, and the zeroth bit set in the 16 bit word.

The system sets the transit table 316 of the bucket 310 starting with the entry 1, not the entry 0 (i.e., zeroth entry or initial entry), since the bit for the entry 0 is automatically the first entry (least significant bit (LSB) or rightmost bit) in the prefix table. Since entry 1 (i.e. first entry) changes prefix value from entry 0, a set bit (1) indicates a new prefix is used for this value. The second entry does not change prefix values from the first entry (e.g., both have the number 3, so a cleared bit (0) indicates the same prefix is used for this value. The third entry changes prefix values from the second entry (e.g., from the number 3 to the number 4), and a set bit (1) indicates a new prefix is used for this value. The fifth entry changes prefix values from the fourth entry (e.g., from the number 4 to the number C), and a set bit (1) indicates a new prefix is used for this value. The resultant transit bits, for the transit table 316, are shown below.

11101

In some embodiments, only five bits would need to be stored, since the fourth "one" bit indicates there are no more entries in the bucket 310. Consider that each 1 in the transit table 316 "consumes" a 1 in the prefix table, and the first 1 is consumed by the start of the bucket 310. This means that, if there are w bits in the prefix table, the wth "one" bit in the transit table 316 corresponds to the end of the transit table 316. This also means it is not necessary to store the number of entries in the bucket 310. Some embodiments perform this operation using intrinsics to count bits. Some embodiments flip the 1s and 0s in the transit table 316 as the example is illustrative and not meant to be limiting. In addition, some embodiments place bits from MSB to LSB.

The number of signature bits is determined by the number of bits allotted for the signature table 316 divided by the number of entries (representing hash values 206) in the bucket 310, taking the floor if necessary. In some embodiments, the number of signature bits could be fixed by the bucket format. In the above example, the signatures (i.e., signature values from the signature field 306 of the hash values 206) are as shown below.

83 25 61 88 01

Some embodiments have a bucket format field 312 in the bucket 310, while others omit the bucket format field and use a fixed format for a specific summary table. This format could differ between summary tables and/or levels of hash tables 120 in the hash pyramid 116 (FIG. 1). In embodiments with the bucket format field 312, these bits indicate the size of the prefix table. In the above example, there could be three table sizes: 16 bits, 32 bits, and 64 bits. This could be encoded in two bits and stored in the bucket format field, with one coding left over to indicate "64+", which means an overflowed bucket with a 64-bit prefix table. Any value after the highest encoded value might be present but not encoded in the table. It should be appreciated that this may lead to additional false positives, but only in proportion to the address space above the top of the last entry. In a further embodiment, "64+" indicates that values above the maximum and below the minimum are potential matches.

The above example does not include the offset of values in the hash table 120 itself. One full offset may cover multiple buckets in some embodiments. Variations on this could be devised, such as having one offset for 1024 buckets and a small (e.g., 3-4 bits) field containing offset from this value. This means that location information for the actual hash table 120 may be small, e.g., a few bits per bucket or less.

From the above example, and the description above regarding the prefix table 314 and the transit table 316, it is seen that the prefix value, i.e., the bits in the prefix field 304 of the hash value 206, can be inferred from a combination of the prefix table 314 and the transit table 316. It is thus not necessary to store the prefix value explicitly in the bucket 310 or any other part of the summary table 320.

With reference back to FIGS. 1-3, there are two important aspects of the summary table 320 and use of compressed indexes in present embodiments that differ from the use of a Bloom filter, for example in levelDB (a key-value store with data sorted by key). A Bloom filter is a probabilistic filter, which can indicate likelihood of membership but cannot indicate a member is definitely present in a Bloom filter. A Bloom filter is thus not deterministic as to positive membership. Consider a search in a summary table 320 for a bucket 310 that matches the bucket address value, prefix value and signature value, i.e., the bits of the bucket address field 302, prefix field 302 and signature field 306. By contrast to a Bloom filter, a first aspect of the summary table 320 is that, if such a search finds such a bucket 310, this indicates there is definitely an entry in the hash table 120 with these exact same bits in a hash value 206. A search with the summary table 320 is thus deterministic as to presence of an entry in a hash table 120, whereas a Bloom filter is not deterministic. Moreover, there are embodiments where the signature value uses all of the remaining bits of the hash value 206, i.e., there is no truncation field 308 and no bits are truncated from the hash value 206 when used to construct the summary table 320. Thus, a positive finding of a bucket 310 in the summary table 320 matching (i.e., containing or including) a hash value 206 indicates the entire hash value 206 is definitely in the corresponding hash table 120. A Bloom filter is incapable of achieving this functionality.

A second aspect of the summary table 320 and use of compressed indexes is that the summary table 320 has or preserves locality of entries in the corresponding hash table 120. A Bloom filter, even if it indicates that a member is likely present (not deterministically so), cannot indicate where to find a member in a hash table. By contrast, the summary table 320 can indicate approximately where to find the hash value 206. For example, assume the summary table 320 indicates a key 202 is in a bucket 310 (e.g., because a search using the hash value 206 of the key 202 turns up a matching bucket 310). Both the signature table 318 and the transit table 316 indicate proximity of entries in a bucket, and this corresponds to proximity of entries in the corresponding hash table 120. Hashes are stored in the same order in the summary table 320, and in the signature table 318, as in the hash table 120. Both the signature table 318 and the transit table 316 provide hints as to locality of hash values 206 in the hash table 120. The bucket 310 thus encodes locality of hash values 206, and the locality indicates where to look in the hash table 120.

With continuing reference to FIGS. 1-3, an aspect of multiple levels of hash tables 120 in the hash pyramid 116, and corresponding summary tables 114 serves for flexible management of data structures in types of memory 106 in the storage system 102 or other suitable computing device. Systems could build hash tables 120 and corresponding summary tables 114 at various intervals, which could be anywhere from rapid (e.g., every few minutes) to slow or infrequent (e.g. days, weeks, months or longer), and could move one or more summary tables 114 into or out of local memory 104 while storing or caching corresponding hash tables 120 in the metadata section 110 of the memory 106. For example, a recent hash table 120 in current and frequent use, or several levels of hash tables 120, could be brought into the metadata section 110 while the corresponding summary tables 114 are in local memory 108, and other less-often used hash tables 120 at deeper levels of the hash pyramid 116 are stored elsewhere in the storage system 102 or off-line. Summary tables 114 for less-often used hash tables and levels of the hash pyramid 116 could be stored in the metadata section 110, and brought into or cached in the local memory 108 on an as-needed or demand basis. Various arrangements with various types of memory (e.g., differing memory types, sizes, costs, and/or access speeds) and various levels of the hash tables 120 and the hash pyramid 116 and corresponding summary tables 114 are readily devised in accordance with specifics of an implementation.

In a further example, a system performing deduplication (e.g., in or after a backup run) could keep one or more summary tables 114 corresponding to a recent deduplication run in the local memory 108, and corresponding hash tables 120 in the metadata section 110. Older summaries and corresponding hash tables 120 could be kept elsewhere in the storage system 102. If a restoration from a backup run is requested, appropriate summary tables 114 and hash tables 120 could be moved into the storage system 102 from other locations in or external to the storage system 102. In some embodiments, the storage system 102 has hash tables 120 in a hash pyramid 116, and holds one or more summary tables 114 in local memory 108, corresponding to one or more of the newer hash tables 120. Further scenarios and corresponding allocations are readily devised for various uses of hash tables 120 and summary tables 114, in accordance with the teachings herein.

Figure 4:
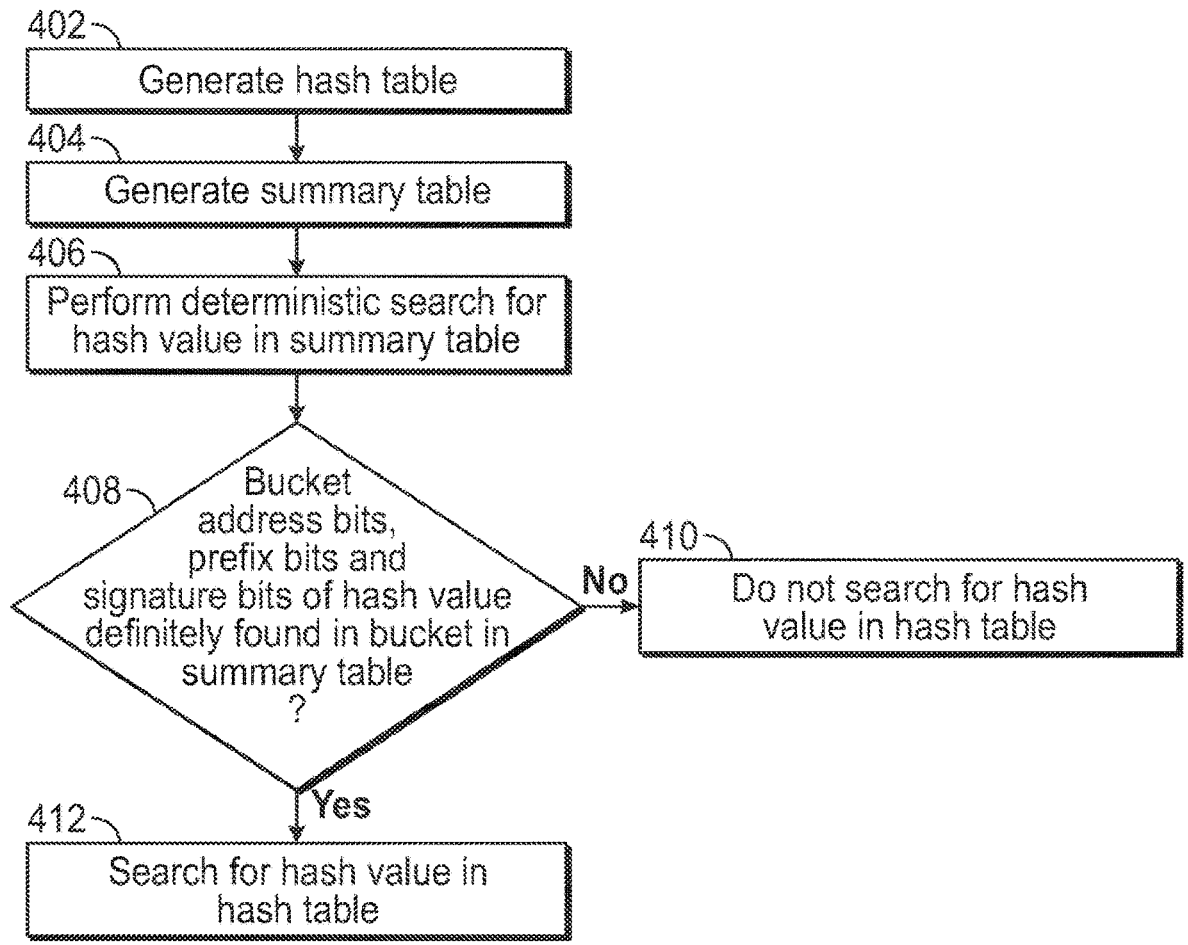
FIG. 4 is a flow diagram of a method for deterministic searching using compressed indexes, which uses the summary table of FIG. 3 in accordance with some embodiments.

FIG. 4 is a flow diagram of a method for deterministic searching using compressed indexes, which uses the summary table of FIG. 3. The method can be practiced in various computing, communication or storage systems, and can be practiced by one or more processors thereof. Although the flow diagram of FIG. 4 omits the 64+ case, a variation in which values above the maximum value in the summary and/or below the minimum value should be searched for in the hash table may be integrated with the embodiments described herein. In an action 402, a hash table is generated. In an action 404, a corresponding summary table is generated, based on hash values of the hash table. The summary table could have the format and be constructed in the manner disclosed with reference to FIG. 3, or variations thereof. In an action 406, a deterministic search is performed for a hash value, in the summary table. This is based on the bit fields of the hash value, as described above with reference to FIG. 3. In a decision action 408, it is determined whether the bucket address bits, prefix bits and signature bits of the hash value are definitively found in a bucket in the summary table. If the answer is no, these bits are not found in any bucket in the summary table, flow branches to the action 410, and no search for the hash value is performed in the hash table. It should be appreciated that a lack of finding of a bucket is a definitive answer that the hash value is not in the hash table. If the answer is yes, these bits are definitively found in a bucket in the summary table, flow proceeds to the action 412, and a search for the hash value is performed in the hash table. A finding of a bucket is a definitive answer that a hash value with the bucket address bits, prefix bits and signature bits is in the hash table.

In a variation on the above method, one approach may perform the following actions:
 1. Look up the bucket;
 2. Look for a prefix bit set. If a prefix bit is not set, end: not in bucket;
 3. Count entries using prefix and transit table as described above if a prefix bit is set;
 4. Determine a size of signature bits, and;
 5. Compare the entries in the signature table against the signature bits from the hash value.

Figure 5:
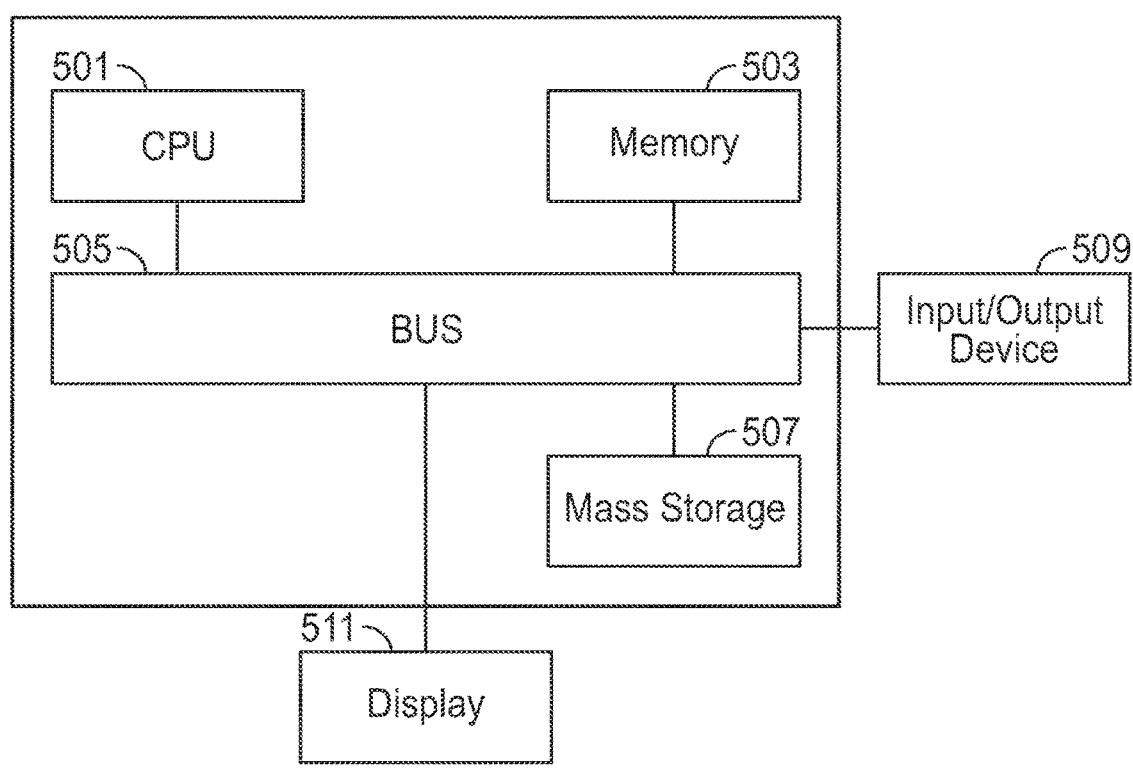
FIG. 5 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 5 is an illustration showing an exemplary computing device which may implement the embodiments described herein. The computing device of FIG. 5 may be used to perform embodiments of the functionality for deterministic searching using compressed indexes and a summary table in accordance with some embodiments. The computing device includes a central processing unit (CPU) 501, which is coupled through a bus 505 to a memory 503, and mass storage device 507. Mass storage device 507 represents a persistent data storage device such as a floppy disc drive or a fixed disc drive, which may be local or remote in some embodiments. The mass storage device 507 could implement a backup storage, in some embodiments. Memory 503 may include read only memory, random access memory, etc. Applications resident on the computing device may be stored on or accessed via a computer readable medium such as memory 503 or mass storage device 507 in some embodiments. Applications may also be in the form of modulated electronic signals modulated accessed via a network modem or other network interface of the computing device. It should be appreciated that CPU 501 may be embodied in a general-purpose processor, a special purpose processor, or a specially programmed logic device in some embodiments.

Display 511 is in communication with CPU 501, memory 503, and mass storage device 507, through bus 505. Display 511 is configured to display any visualization tools or reports associated with the system described herein. Input/output device 509 is coupled to bus 505 in order to communicate information in command selections to CPU 501. It should be appreciated that data to and from external devices may be communicated through the input/output device 509. CPU 501 can be defined to execute the functionality described herein to enable the functionality described with reference to FIGS. 1-4. The code embodying this functionality may be stored within memory 503 or mass storage device 507 for execution by a processor such as CPU 501 in some embodiments. The operating system on the computing device may be MS DOS™, MS-WINDOWS™, OS/2™, UNIX™, LINUX™, or other known operating systems. It should be appreciated that the embodiments described herein may be also be integrated with a virtualized computing system that is implemented with physical computing resources.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a tangible non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A method, comprising:
generating address bits, prefix bits, and signature bits from a value, to prepare for a search for the value in a compressed index summary table;
determining a container in the compressed index summary table at an address specified by the address bits, the container comprised of a prefix table with bits set corresponding to the prefix bits determined by aggregate values associated with the container and a signature table containing the signature bits, wherein the prefix bits are associated with a prefix value that sets a bit in the prefix table, and wherein the signature bits are associated with a signature in the signature table;
searching for a match in the compressed index summary table, based on a function of values within the prefix and signature tables; and
determining, by one or more processors, whether the value is contained in a hash table corresponding to the summary table based on the searching.

2. The method of claim 1, wherein a result of the search is a determination that the value is not contained in the hash table.

3. The method of claim 1, wherein each container has a transit table that indicates whether a corresponding set of signature bits from the signature table have a same prefix as a preceding set of signature bits from the signature table.

4. The method of claim 1, wherein determining whether the value is contained in the hash table is performed using the transit table, prefix table, and signature table.

5. The method of claim 1, wherein the value being searched for is an entirety of a key stored in the hash table.

6. The method of claim 1, wherein determining a search result indicates an approximate location in the hash table at which the desired value would be found.

7. The method of claim 1, wherein determining the container using the compressed index comprises:
identifying a container;
determining whether a prefix table of the identified container has a bit set according to the prefix bits of the value; and
determining whether the signature table of the identified container has the signature bits from the value.

8. A non-transitory, computer-readable media having instructions thereupon which, when executed by one or more processors, cause the one or more processors to perform operations comprising:
separating bits of a value into address bits, prefix bits and signature bits, to prepare for a search for the value in a compressed index summary table;
determining a container using the compressed index summary table at an address specified by the address bits, wherein the container comprises a prefix table with bits set according to the prefix bits determined by aggregate values associated with the container and a signature table containing the signature bits determined by the aggregate values associated with the container, wherein the prefix bits are associated with a prefix value that sets a bit in the prefix table, and wherein the signature bits are associated with a signature input into the signature table; and
identifying, using the one or more processors, a search result from the compressed index summary table, based on a function of the prefix and signature tables and the determined prefix and signature bits.

9. The non-transitory computer-readable media of claim 8, wherein determining the search result comprises determining that the value is not contained in a hash table corresponding to the compressed index summary table.

10. The non-transitory computer-readable media of claim 8, wherein each container has a transit table indicating whether a corresponding set of signature bits from the signature table have a same prefix as a preceding set of signature bits from the signature table.

11. The non-transitory computer-readable media of claim 8, wherein the transit table, prefix table, and signature table are used to determine whether the value is contained in a hash table.

12. The non-transitory computer-readable media of claim 8, wherein the value is an entirety of a key stored in a hash table.

13. The non-transitory computer-readable media of claim 8, wherein a match of the container to the value comprises:
identifying the container;
finding a bit set in the prefix table of the container according to the prefix bits of the value; and
finding the signature bits of the value in the signature table of the container.

14. The non-transitory computer-readable media of claim 8, wherein the container is one of a plurality of containers in the compressed index summary table that includes encoding locality of hash values of a hash table into transit tables of the plurality of containers.

15. A system, comprising:
one or more processors configured to:
separate a value into address bits, prefix bits and signature bits, to prepare for a search for the value in a compressed index summary table;
determine a container using the compressed index summary table at an address specified by the address bits, the container comprised of a prefix table with bits according to the prefix bits determined by aggregate values associated with the container and a signature table containing the signature bits determined by the aggregate values associated with the container, wherein the prefix bits are associated with a prefix value that sets a bit in the prefix table, and wherein the signature bits are associated with a signature input into the signature table; and
search for a match in the compressed index summary table, based on a function of values within the prefix and signature; and
determine whether the value is stored in a hash table corresponding to the summary table based on the search.

16. The system of claim 15, wherein a result of the search includes a determination that the value is not contained in the hash table.

17. The system of claim 15, wherein the one or more processors are configured to generate the compressed index summary table having a plurality of containers, wherein each container of the plurality of containers has a transit table that indicates whether a corresponding set of signature bits from the signature table have a same prefix as a preceding set of signature bits from the signature table.

18. The system of claim 15, wherein the one or more processors use the transit table, prefix table and signature table to determine whether the value is contained in the hash table.

19. The system of claim 15, wherein the value being searched for is an entirety of a key stored in the hash table.

20. The system of claim 15, wherein determining the search result indicates an approximate location in the hash table at which the desired value is found.

* * * * *